J. W. HELTZEL.
WELDING CLAMP.
APPLICATION FILED APR. 7, 1919.

1,309,067.

Patented July 8, 1919.

Inventor
J. W. HELTZEL
By C. A. Snow & Co.
Attorneys

Witness

UNITED STATES PATENT OFFICE.

JOSEPH W. HELTZEL, OF WARREN, OHIO.

WELDING-CLAMP.

1,309,067.  Specification of Letters Patent.  Patented July 8, 1919.

Application filed April 7, 1919. Serial No. 288,025.

*To all whom it may concern:*

Be it known that I, JOSEPH W. HELTZEL, a citizen of the United States, residing at Warren, in the county of Trumbull and State of Ohio, have invented a new and useful Welding-Clamp, of which the following is a specification.

This invention relates to improvements in welding clamps, the object of the invention being to provide an improved clamp adapted to hold two pieces in position to be welded together, by means of which the punching of holes in the pieces is unnecessary and which is comparatively simple in construction and very efficient in use.

A further object of the invention is the provision of a clamp of the character set forth in the use of which, by a slight change in certain of the parts of the clamp, pieces of varying shapes may be held in position to be welded together.

A still further object of the invention is the provision of a clamp by means of which a complete structure made up of pieces to be welded together may be assembled in its entirety before welding.

With the foregoing and other objects in view, which will appear as the description proceeds, the invention consists in the novel features of construction and combination of parts which will be more fully described hereinafter and particularly pointed out in the claims.

In the drawings accompanying and forming part of this specification,

The same characters of reference designate the same parts in the different figures of the drawings.

Figure 1:
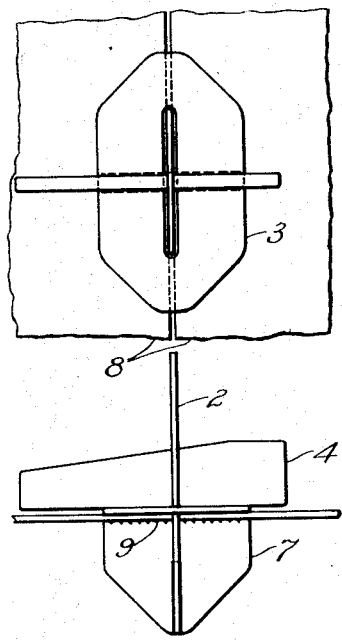
Figure 1 is a plan view showing my improved clamp holding a pair of flat metal pieces in position to be welded, the pieces being broken away at their edges.

In the welding together of plates by the oxy-acetylene and electric processes as heretofore practised, it is the usual practice to punch holes along the edges of the members or plates to be welded together and to place steel bars across the same, with bolts passing through the bars and the holes in the edges of the pieces to be welded. After the welding is completed it is customary to remove the holding bolts and close the holes in the welded plates by welding, which procedure is very expensive. The present invention is intended to do away with the necessity for drilling holes in the members to be welded and to provide a clamp that will effectively hold the members in position to be welded, and which may easily be removed after the welding is completed.

In the embodiment of the invention herein illustrated, the clamp comprises essentially three members, viz., a slotted plate 2, a second slotted plate 3, and a wedge-shaped member 4. The plates 2 and 3 are each formed with a longitudinal slot therein, designated 5 and 6 respectively. The plate 2 is provided with a base member 7 at right angles thereto, and which member is preferably secured to the plate by forming a kerf transversely of the member 7 at the lower end thereof and passing one-half of the member 7 through the slot 5 in the plate 2 and pushing the member 7 down, with its kerf straddling the end wall of the slot 5, until the lower end of the member 7 is in line with the lower end of the plate 2. The members 2 and 7 are thus held together so that they extend in symmetrical right angular relation to each other, thereby forming a cruciform base member.

In the use of the clamp above described, the pieces 8 to be welded together are placed on the upper end of the member 7, one at each side of the slotted extension of the plate 2. The plate 3 is then placed with its slot 6 over the upper end of the plate 2 and brought down over said plate until it engages the pieces to be welded. The wedge-shaped member 4 is then passed through the upper portion of the slot 5 in the plate 2 and forced in sufficiently far to securely hold the pieces to be welded between the plate 3 and the upper ends of the members 7. The pieces 8 may then be welded all along their contiguous edges except at the points where the plates 2 pass between them. The clamps are then removed from the pieces and the unwelded spaces that were occupied by the clamps may then be welded.

Figure 4:
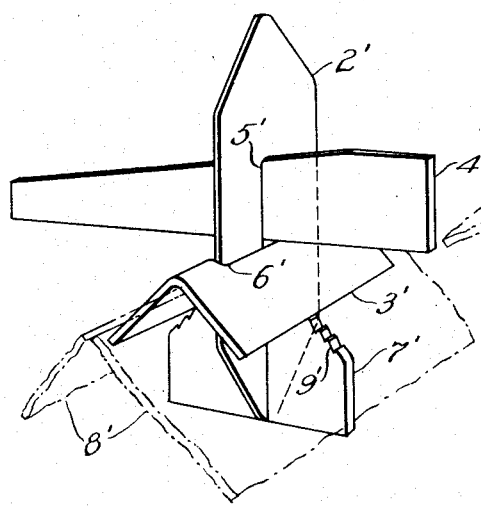
Fig. 4 is a perspective view showing the clamp adapted for holding pieces to be welded at right angles to each other.

In Fig. 4 I have shown the clamp adapted to hold pieces to be welded at right angles to each other, as for instance the sides of a rectangular structure. In this case the base member 7' has the upper edge thereof at one side of the plate 2' at right angles to the edge at the other side of the said plate 2', and the plate 3' is bent at the longitudinal center line thereof into L-shaped form. The wedge-shaped member 4' is identical in form with that already described.

Figure 5:
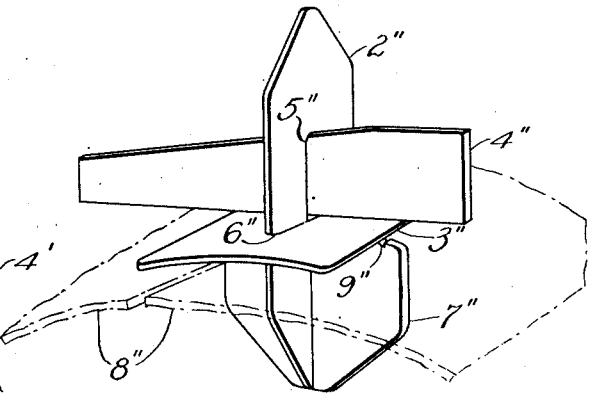
Fig. 5 is a view similar to Fig. 4, but showing the clamp adapted for holding the edges of a cylindrical member in position to be welded together.

In Fig. 5 is shown the clamp adapted to hold the edges of a cylindrical body in position to be welded together. In this case the upper edges of the member 7'' extending at opposite sides of the plate 2'' are of curved formation, as is also the plate 3'', the wedge member 4'' being identical in form with those already described. The upper edges of the members 7, 7' and 7'' are provided with serrations, as shown at 9, 9' and 9'', respectively, in order to prevent displacement of the pieces clamped thereon.

Figure 2:
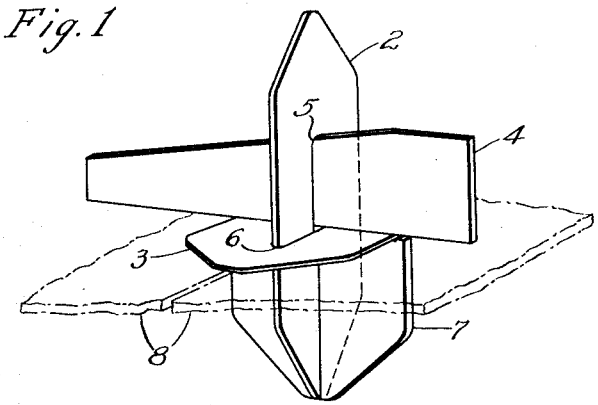
Figs. 2 and 3 are, respectively, a perspective view and a side elevation thereof.
Figure 3:
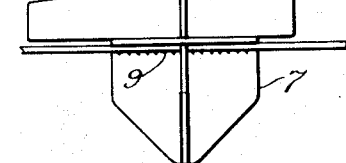

From the foregoing it will be observed that by merely changing the form of the upper edge of the base member and the holding plate the clamp may be adapted to hold pieces of any desired form in position to be welded together. It will also be seen that in structures in which the corner and flat clamps are used it is possible to set up the entire structure complete before starting to weld, thereby making sure that the parts are properly shaped before being welded. It will, furthermore, be obvious that while the use of a clamping plate, such as that designated by the numeral 3 in Figs. 1 to 3, is preferred in the present embodiment, this plate is not absolutely essential and may be dispensed with if desired, since the wedge 4 would exert sufficient pressure on the members to be held without the interposition of such plate.

While I have described in detail the structure illustrated herein, it is to be understood that I do not thereby limit my invention to the precise features of construction shown, as I am aware that many mechanical changes may be made therein without departing from the spirit and scope of the invention as set forth in the appended claims.

Having thus described my invention, what I claim is:

1. A device of the class described, comprising a cruciform base member having a portion extending longitudinally therefrom and provided with a slot, a slotted plate adapted to straddle said portion, and a wedging member adapted for insertion into the slot of said portion.

2. A device of the class described, comprising a pair of slotted plates, a member secured to one of said plates in symmetrical right angular relation thereto, the slotted portion of the plate being adapted to pass through the slot in the other plate, and means for forcing said last-named plate into tight engagement with said member.

3. A device of the class described, comprising a pair of slotted plates, a member secured to one of said plates in symmetrical right angular relation thereto, the slotted portion of the plate being adapted to pass through the slot in the other plate, and a wedge-shaped member adapted for insertion into said slotted portion.

4. A device of the class described, comprising a cruciform base member formed of a slotted plate and a member passing halfway through said slot and straddling the end wall thereof, and means above said cruciform member for clamping thereon a pair of pieces to be welded.

5. A device of the class described, comprising a flat, slotted vertical member, a second flat slotted member adapted to drop in and fit the lower portion of the slot of said vertical member at right angles thereto, thereby forming a seat for the reception of a pair of members to be welded together, and a wedge-shaped member adapted to pass partly through the upper portion of the slot of the vertical member and to exert pressure on the members seated on said seat-forming members.

In testimony that I claim the foregoing as my own I have hereto affixed my signature in the presence of two witnesses.

JOSEPH W. HELTZEL.

Witnesses:
A. S. PHELPS,
HENRY ORTINGER.